Dec. 26, 1950  E. V. MATHY  2,535,944
CATALYTIC APPARATUS
Filed Sept. 19, 1946
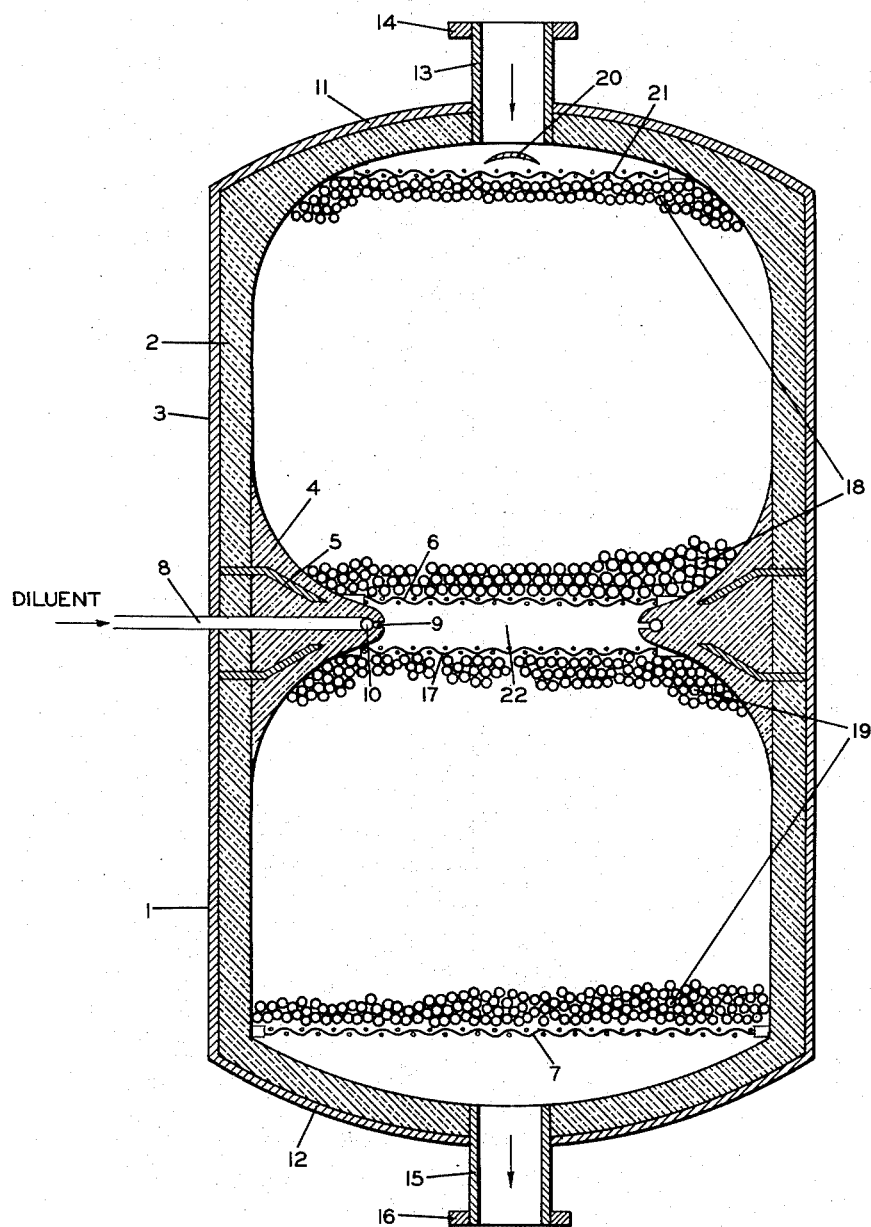
INVENTOR
E. V. MATHY
BY Hudson & Young
ATTORNEYS Patented Dec. 26, 1950

2,535,944

UNITED STATES PATENT OFFICE 2,535,944

CATALYTIC APPARATUS

Eugene V. Mathy, Bartlesville, Okla., assignor to Phillips Petroleum Company, a corporation of Delaware Application September 19, 1946, Serial No. 697,964

1 Claim. (Cl. 23—288)

This invention relates to the endothermic catalytic conversion of hydrocarbons. Certain aspects of the invention relate to novel catalytic apparatus. The invention in one embodiment relates to the catalytic cracking of hydrocarbons to form lower boiling hydrocarbons in the presence of added diluent gases. This invention further relates to catalytic conversions of the nature described in which catalyst regeneration is effected by introduction of regeneration gas at a plurality of points in a reactor containing one or more stationary beds of catalyst.

The catalytic conversion of hydrocarbons has become of great commercial importance. It has frequently been found desirable to effect the reaction in the presence of added gases which may act as diluents or as reactants. These gases frequently are added at one or more intermediate points along the line of flow of the reaction mixture, the object being either to supply heat or cooling to the reaction or to provide better control of reactant concentration. Furthermore, in some instances it is desired to change the character of conversion at a mid-point by effecting a substantial change in reaction mixture composition, temperature, or flow rate.

In adding gases of the nature described it has been customary to introduce same by means of spreaders located within the catalyst chamber and comprising multiple radial arms of pierced conduits of one type or another. Only imperfect distribution and mixing are thus obtained, and some of the openings frequently become plugged thus further lessening the efficiency and uniformity of distribution of the incoming gases. In order to minimize these undesirable effects the catalyst is sometimes employed in the form of a plurality of beds separated by void spaces of considerable size. The spreaders are located within these catalyst-free spaces, thus allowing a substantial time for intermixture to occur prior to bringing the reaction mixture again into contact with the catalyst. This arrangement, however, is frequently undesirable particularly in the case of catalytic cracking of hydrocarbons, in that catalytic reactions cease and thermal reactions are allowed to proceed in the void spaces. This results in the production of products of an entirely different nature from those resulting from the action of the catalyst, with consequent inefficiencies of product distribution and difficulties in subsequent product separation steps.

Another problem arising in fixed-bed catalytic hydrocarbon conversions is the so-called "wall effect." This term derives its name from the fact that gas flow is more rapid toward the periphery of a catalyst chamber then in the center. This results in uneven use of the catalyst and in very substantial temperature differentials between center and edge of the catalyst bed. The more rapid flow along the walls also encourages the formation of channels through the catalyst bed with consequent unevenness of flow.

It is an object of this invention to provide an improved method for converting hydrocarbons in the presence of a fixed body of catalyst.

Another object of the invention is to minimize channeling through a catalyst bed.

A further object is to increase the uniformity of the flow of hydrocarbons through a bed of catalyst.

A still further object of the invention is to effect the endothermic conversion of hydrocarbons in the presence of diluent and/or reactive gases which are introduced at one or more intermediate points within a catalytic reactor.

Yet another object is to improve the rapidity and uniformity of mixing of such added gases.

A further object of the invention is to provide improved catalytic apparatus.

An additional object is to crack hydrocarbons catalytically in the presence of steam.

A further object of the invention is to improve the regeneration of spent hydrocarbon conversion catalysts.

Other objects and advantages of the invention will be apparent to one skilled in the art from the accompanying disclosure and discussion.

The present invention will be described with particular reference to the cracking of gas oil or the like over a cracking catalyst in the presence of steam. It will be understood that the principles of the invention may readily be applied to other conversions with suitable modification where necessary. In accordance with a preferred embodiment of the invention, a cylindrical catalyst chamber is separated into two or more sections by means of a streamlined annular structure projecting from the inside surface of the catalyst chamber toward the center thereof, in a manner shown in detail in the accompanying drawing. Within this annular structure is located an annular conduit for carrying diluent or reactive gases, which are introduced into the catalyst chamber by means of a plurality of inlet nozzles or jets directed toward the center of the chamber. A very small space is maintained free of catalyst at this point to allow rapid and intimate mixture of gases. The annular dividing structure is streamlined on the upper and lower surfaces so that gases flowing along the chamber wall are caused to converge toward the axis of the chamber in streamlined flow, and after admixture of reactant gases with the gases introduced by means of the inlets described above the gases leaving the mixing zone continue their flow through the catalyst chamber in a streamlined manner so that the gas mixture near the walls gradually flows outwardly toward the cylindrical portion of the wall in the latter part of the catalyst chamber. One or more annular inlet structures of the nature described may be employed in a given catalyst case, in accordance with the particular conversion being effected.

In the present description and claims, streamlined flow and flow in a streamlined manner means unbroken nonturbulent flow of fluids over a surface and past a body. Streamlined construction means a surface which produces such smooth nonturbulent flow and over which fluids will pass in unbroken nonturbulent manner. Such streamlined surfaces are, of necessity, smooth and regular divergent or convergent curvatures.

By streamlined construction and flow of gases in the catalyst chamber, a central restricted point of high turbulence is set up into which are injected the diluent or reactive added gases. An extremely rapid and intimate mixing is thus obtained. The flow of gases, however, is then rapidly restored to substantially non-turbulent flow through the catalyst by means of the streamlined construction of the lower surface of the inlet structure. The upper and lower catalyst bed are themselves curved in shape at their lower and upper extremities, respectively, and the flow of gases therethrough is made much more uniform than would be the case if they were purely cylindrical. Void space within the catalyst chamber is reduced to a minimum by my method of construction and operation. Preferably the upper part of the catalyst chamber is also streamlined so that the top of the upper catalyst bed is shaped similarly to the top of the lower catalyst bed. Likewise, the lowest portion of the chamber wall may be shaped similarly to the streamlined upper surface of the annular inlet structure.

Preferably the annular inlet structure of the invention is fabricated from an insulating cement rather than from metal, with resultant economy of manufacture, operation, and upkeep, since it has been found that metal used at this point is subject to rather severe corrosion and erosion. Accordingly, the use of expensive alloy steels is reduced to a minimum.

The accompanying drawing shows in somewhat idealized form one preferred form of apparatus suitable for the practice of my invention. It will be appreciated that certain modifications may be made without departing from the scope and spirit of the invention.

In the drawing, the reaction chamber comprises a vertical cylinder 1 having a concave top 11 and concave bottom 12. A large inlet conduit 13 is provided at the top axially located with respect to the cylinder and having a flange 14 for connection to the transfer line (not shown) by means of which reactants are passed into the reactor. Cup-shaped baffle 20 (supported by means not shown) aids in initial distribution of reactants. Screen 21 may be placed on top of the top catalyst bed 18. After flow through the chamber the reaction mixture exits through a centrally located outlet conduit 15 provided with a flange 16 for connection with a transfer line (not shown) which is used to pass reaction products to separation and fractionation steps. The outside shell of chamber 1, including the top 11 and bottom 12, is made of metal having sufficient strength to support the material inside and capable of withstanding the conditions of operation. Preferably this is constructed of steel having a thickness of about 1 inch. The shell is provided with an internal insulating liner 2 which may be about 6 to 12 inches in thickness, depending upon the amount of insulation required.

The liner is cast within the shell from an insulating refractory cement as from a suitable commercial product such as "Insulcrete," "Panelag," or the like. The liner is fastened to the shell by any of a number of well known means (not shown) and may also include reinforcing metal, vapor stops, or other known elements for reinforcing the insulation and for making the liner impervious to the flow of vapors.

At one or more levels in the reactor where it is desired to inject the diluent gases, an annular constricting element 4 built up of cast insulation is installed. This construction is made in the form shown so that the flow of gases over its outer surface is always streamlined. It is composed of insulating cement similar to that used in casting liner 2. Reinforcing bars 5 which are fastened to the outer shell 1 of the vessel are used to support the casting. Element 4 is of such size that the open flow area at the center of the catalyst chamber is preferably from 25 to 40 per cent of the maximum cross-sectional area of the chamber. A conduit means 8 for admitting the gases to the distributor 10 is embedded in the insulation. The distributor 10 is a circular annular conduit embedded just inside the inner wall of the constriction 4. This distributor has a multiplicity of extended openings 9 in the form of nipples, nozzles or jets which connect with the space 22 within the constriction. This space 22 is enclosed on both the top and the bottom by supported screens 6 and 17, respectively, which are strong enough to support the weight of the catalyst above and yet are fine enough to prevent passage of catalyst particles. The screens may be made up from a grid of ¼" x 1" bars on edge with openings 1 to 1½" wide on top of which is laid a 4-mesh screen which in turn is covered by a 30-mesh screen. The space 22 enclosed by these screens and into which the diluent gases are injected is quite small with respect to the total catalyst volume, yet provides sufficient space for the rapid and intimate mixing of the gases or vapors which are injected through the conduit 8 and the reactants passing through this space 22 from the catalyst bed above. The upper portion of the chamber contains catalyst bed 18 resting on screen 6. It will be noted that this bed is not wholly cylindrical but that the diameter of the lower portion thereof gradually and smoothly decreases so that gases flowing through the bed near its periphery approach the center of the catalyst chamber in streamlined manner. Furthermore, the upper portion of bed 18 likewise deviates from the cylindrical in streamlined manner as shown. The lower section of the catalyst chamber contains catalyst bed 19 which rests on the supporting screen box 7 and which extends completely up to screen 17, which is the lower boundary of the inlet space 22 defined by screens 17 and 6. It will likewise be noted that catalyst bed 19 is cylindrical in the lower portion thereof but that the diameter of the upper portion gradually and regularly decreases as the top of the bed is approached, thus insuring streamlined flow of gases as explained. The lower portion of bed 19 may also be constricted into a shape similar to that of the lower portion of bed 18 in order to minimize the "wall-effect," although this is not shown in the particular embodiment illustrated in the drawing.

In a straight-walled chamber the gases travel through the portion of the catalyst bed near the walls at a faster rate than in the center of the bed. By virtue of the venturi construction shown herein, the rate of flow is substantially equalized. In other words, the time required for flow from top to bottom of catalyst beds is substantially equal for all portions of the gas passing therethrough. In contradistinction to the conventional spreaders which result in uneven distribution, the high turbulence within the space 22 defined by screens 6 and 17 caused by the streamlined construction and by the jets 9 entirely eliminates this problem. A partial plugging of jets 9 does not substantially reduce the efficiency of mixing, whereas, any plugging in the conventional drum-type spreader causes mal-distribution.

In order to illustrate certain features of the invention the following example is given. It will, of course be understood that other conversions may be effected in accordance with the invention, and that various changes may be made in proportions, catalyst, and reaction conditions without departing from the broad scope of the invention.

In a typical gas oil cracking run using a vertical cylindrical catalyst chamber with drum spreaders placed at the mid point of the chamber, 190 barrels per hour of oil at a space velocity of one liquid volume oil per volume of catalyst per hour and 9,000 pounds of steam per hour were charged to the top of the catalyst chamber. A bauxite catalyst of about 8-14 mesh was employed. The inlet vapors entered the catalyst at 1020° F. and at 85 p. s. i. pressure. Steam at 1100° F. was injected into the spreader connection of the chamber at the rate of 2800 pounds per hour.

During operation of this chamber the temperature profile when taken in a horizontal plane across the bed showed temperatures at the edge of the bed as much as 40° F. higher than those at the center. In contrast, when operating under the same conditions with a chamber constructed in accordance with the present invention as described above, much better distribution of the injected steam is obtained. The temperature gradient between the walls and the center of the reactor is greatly reduced and the maximum gradient ranges from about 10 to 15° F.

In the regeneration of the catalyst masses after completion of the process cycle, by burning carbonaceous matter from the catalyst by means of air and steam, a burning zone passes from the top to the bottom of the catalyst bed. This burning zone in the wholly cylindrical chamber has a front in the shape of an inverted saucer. However, when the chamber is constructed in accordance with the principles described herein the burning zone when in the upper portion of the chamber is leveled out due to the shape of the catalyst bed. The gases are then thoroughly mixed with added combustion gases in the mixing space and then redistributed so that the burning zone is also leveled out when in the lower chamber. In a vertical catalyst chamber an important saving in regeneration is obtained by keeping the burning zone level and horizontal, in that regeneration gases are not wasted by premature breakthrough near the chamber walls.

I claim:

An improved catalytic reactor adapted for endothermic catalytic reactions wherein diluent or reactant gases are introduced into the reaction mixture at an intermediate point, which comprises an elongated vertical cylindrical catalyst-containing chamber internally insulated with refractory cement and having an axial inlet and axial outlet at opposite ends thereof, a catalyst-retaining transverse screen within said chamber near the outlet thereof, and at least one annular structure as described hereinbelow intermediate the inlet and said screen dividing said chamber into at least two sections, each said section having a central cylindrical portion, said annular structure having concave top and bottom surfaces of refractory insulating cement each tangentially joining said central cylindrical portions of their respective sections and regularly converging inwardly and toward each other in smooth unbroken arcuate curves toward but not attaining the horizontal to form a restriction to the flow of fluids passing through said chamber, the inner diameter of said annular structure being such that the restricted opening between the sections has a cross-sectional area of from 25 to 40 per cent that of the cross-sectional area of the cylindrical portions of said sections, a pair of parallel transverse catalyst-retaining screens extending across and adjacent said restriction and together with the inner surface of said annular structure defining a catalyst-free space quite small with respect to the total catalyst volume, the uppermost of said pair of screens plus the upper curved surface of said annular structure being adapted to support a bed of catalyst thereupon whereby said bed of catalyst will have a smoothly curved lower surface corresponding to said upper annular surface, the lowermost of said pair of screens plus the lower curved surface of said annular structure being adapted to confine a bed of catalyst filling the section of chamber therebelow whereby said bed of catalyst will have a smoothly curved upper surface corresponding to said lower annular surface, an annular conduit within each said annular structure, means for supplying fluid to said conduit, and a plurality of inlets extending from said conduit into said space for flow of fluid thereinto for admixture with fluids passing longitudinally through said chamber.

EUGENE V. MATHY.

REFERENCES CITED

The following references are of record in the file of this patent:

UNITED STATES PATENTS

| Number | Name | Date |
| --- | --- | --- |
| 1,144,730 | Schaefer | June 29, 1915 |
| 1,959,898 | Brode et al. | May 22, 1934 |
| 2,353,509 | Schulze et al. | July 11, 1944 |
| 2,417,348 | Carter | Mar. 11, 1947 |